United States Patent
Shigetomi

(10) Patent No.: US 11,255,950 B2
(45) Date of Patent: Feb. 22, 2022

(54) RADAR ANTENNA DEVICE, AND METHOD FOR MEASURING DIRECTION

(71) Applicant: FURUNO ELECTRIC CO., LTD., Hyogo (JP)

(72) Inventor: Motomu Shigetomi, Nishinomiya (JP)

(73) Assignee: FURUNO ELECTRIC CO., LTD., Hyogo (JP)

(*) Notice: Subject to any disclaimer, the term of this patent is extended or adjusted under 35 U.S.C. 154(b) by 0 days.

(21) Appl. No.: 16/899,596

(22) Filed: Jun. 12, 2020

(65) Prior Publication Data

US 2020/0309906 A1    Oct. 1, 2020

Related U.S. Application Data

(63) Continuation of application No. PCT/JP2018/047477, filed on Dec. 25, 2018.

(30) Foreign Application Priority Data

Jan. 30, 2018 (JP) .............................. JP2018-013143

(51) Int. Cl.
*G01S 7/40* (2006.01)
*G01S 7/02* (2006.01)

(52) U.S. Cl.
CPC .............. *G01S 7/4026* (2013.01); *G01S 7/40* (2013.01); *G01S 7/027* (2021.05); *G01S 7/403* (2021.05)

(58) Field of Classification Search
CPC .......... G01S 7/4026; G01S 7/40; G01S 7/027; G01S 7/403
USPC ....................................................... 342/173
See application file for complete search history.

(56) References Cited

U.S. PATENT DOCUMENTS

| | | | |
|---|---|---|---|
| 6,603,421 B1* | 8/2003 | Schiff | G01S 13/86 342/13 |
| 6,937,184 B2* | 8/2005 | Fujieda | G01S 7/03 342/1 |
| 7,233,795 B1* | 6/2007 | Ryden | G01S 5/0289 455/445 |
| 8,974,712 B2* | 3/2015 | Ohtake | G01S 7/03 264/255 |
| 9,007,254 B2* | 4/2015 | Vangen | H01Q 19/10 342/1 |

(Continued)

FOREIGN PATENT DOCUMENTS

| | | | | |
|---|---|---|---|---|
| EP | 2051097 A1 * | 4/2009 | ........... | G01S 13/282 |
| EP | 2375492 A1 * | 10/2011 | ............... | H01Q 1/42 |

(Continued)

OTHER PUBLICATIONS

"International Search Report (Form PCT/ISA/210) of PCT/JP2018/047477," dated Mar. 5, 2019, with English translation thereof, pp. 1-4.

*Primary Examiner* — Bernarr E Gregory
*Assistant Examiner* — Nuzhat Pervin
(74) *Attorney, Agent, or Firm* — JCIPRNET

(57) ABSTRACT

An inexpensive and compact antenna device having a direction measurement function is provided. A radar antenna device includes a radome, an antenna, and a magnetic direction measurement part. The antenna transmits and receives a radio wave while rotating inside the radome. The magnetic direction measurement part is accommodated in the radome, and measures a direction of the radar antenna device based on the detected magnetism.

14 Claims, 5 Drawing Sheets

(56) References Cited

U.S. PATENT DOCUMENTS

| | | | |
|---|---|---|---|
| 9,502,760 B2 * | 11/2016 | Fujita | H01Q 1/422 |
| 10,176,718 B1 * | 1/2019 | Mazuir | G08G 1/123 |
| 10,181,641 B2 * | 1/2019 | Meyer | G01S 7/024 |
| 10,347,980 B2 * | 7/2019 | Miyagawa | H01Q 1/42 |
| 10,367,265 B2 * | 7/2019 | Richardson | H04B 14/006 |
| 2002/0016663 A1 * | 2/2002 | Nakamura | B60K 31/0008 |
| | | | 701/96 |
| 2003/0028294 A1 * | 2/2003 | Yanagi | G01S 13/937 |
| | | | 701/21 |
| 2004/0036645 A1 * | 2/2004 | Fujieda | G01S 7/032 |
| | | | 342/70 |
| 2006/0158369 A1 * | 7/2006 | Shinoda | G01S 13/931 |
| | | | 342/70 |
| 2008/0042896 A1 * | 2/2008 | Alon | G01S 7/4026 |
| | | | 342/174 |
| 2009/0102468 A1 * | 4/2009 | Takahashi | G01D 5/145 |
| | | | 324/207.25 |
| 2009/0121922 A1 * | 5/2009 | Fujikawa | G01S 7/12 |
| | | | 342/185 |
| 2010/0182140 A1 * | 7/2010 | Kohno | G01C 21/3697 |
| | | | 340/438 |
| 2012/0245874 A1 * | 9/2012 | Cain | G01C 17/02 |
| | | | 702/92 |
| 2014/0070995 A1 * | 3/2014 | Itagaki | H01Q 3/26 |
| | | | 342/372 |
| 2014/0204000 A1 * | 7/2014 | Sato | H04W 64/00 |
| | | | 345/2.3 |
| 2014/0225596 A1 * | 8/2014 | Nakamura | G01D 5/145 |
| | | | 324/207.2 |
| 2016/0069675 A1 * | 3/2016 | Bando | G01B 21/00 |
| | | | 701/519 |
| 2016/0365625 A1 * | 12/2016 | Meyer | G01S 7/292 |
| 2017/0176586 A1 * | 6/2017 | Johnson | G01C 17/38 |
| 2017/0179588 A1 * | 6/2017 | Miyagawa | H01Q 1/42 |
| 2017/0299707 A1 * | 10/2017 | Nguyen | B60T 7/22 |
| 2017/0356785 A1 * | 12/2017 | Hengstler | G01S 7/4052 |
| 2018/0045518 A1 * | 2/2018 | Gharavi | G01C 21/165 |
| 2018/0267138 A1 * | 9/2018 | Sakurai | H01Q 15/02 |
| 2019/0339385 A1 * | 11/2019 | Nakamizo | G01S 13/426 |
| 2019/0346562 A1 * | 11/2019 | Peng | G01S 7/4026 |

FOREIGN PATENT DOCUMENTS

| | | | | |
|---|---|---|---|---|
| JP | H06196917 | | 7/1994 | |
| JP | H077212 | | 1/1995 | |
| JP | H0714710 | | 3/1995 | |
| JP | H0714710 U | * | 3/1995 | H01Q 1/27 |
| JP | 2003084059 | | 3/2003 | |
| JP | 2011166885 A | * | 8/2011 | |
| JP | 2017096767 | | 6/2017 | |
| JP | 2017096767 A | * | 6/2017 | G01S 13/87 |
| WO | WO-2008016033 A1 | * | 2/2008 | G01S 7/03 |

* cited by examiner

RADAR ANTENNA DEVICE, AND METHOD FOR MEASURING DIRECTION

CROSS-REFERENCE TO RELATED APPLICATION

This application is a Continuation of PCT International Application No. PCT/JP2018/047477, filed on Dec. 25, 2018, which claims priority under 35 U.S.C § 119(a) to Japanese Patent Application No. 2018-013143, filed on Jan. 30, 2018. Each of the above application(s) is hereby expressly incorporated by reference, in its entirety, into the present application.

BACKGROUND

Technical Field

The disclosure mainly relates to a configuration in which a direction is measured in a radar antenna device including an antenna that transmits and receives radio waves while rotating.

Conventional Art

Conventionally, there has been known a configuration in which a direction measurement device is attached to a radar antenna device used in a ship or the like to acquire a direction of the ship. Patent Document 1 discloses this kind of radar antenna device.

An antenna device of Patent Document 1 has a configuration in which a GPS compass composed of a plurality of GPS antennas receiving and processing GPS signals from GPS satellites and outputting digital data is provided above a radar antenna transmitting radar beams and receiving radar echoes and outside a radar beam radiation range.

PATENT DOCUMENTS

Patent Document 1: Japanese Patent Laid-Open No. 2003-84059

However, since the above-mentioned configuration of Patent Document 1 uses an expensive GPS compass, the cost may increase. As a method capable of inexpensively measuring geomagnetism, a magnetic direction measurement device has been proposed. However, the magnetic direction measurement device is susceptible to magnetism generated by surrounding components or structures (such as the hull or the like). Particularly, when a movable component is present around, since the influence of the magnetism generated by the movable component changes with time, correction cannot be made by magnetic deviation correction or the like by the magnetic direction measurement device, and it is difficult to ensure measurement accuracy.

That is, as radars that use no magnetrons are widespread, even though it is possible to change the expensive GPS in Patent Document 1 to an inexpensive magnetic direction measurement device, because movable components such as antennas and mechanical components for driving the antennas are present in a radar device, to remove the influence of these components becomes a new problem.

The disclosure provides an inexpensive and compact antenna device having a direction measurement function.

SUMMARY

The purpose of this disclosure relates to a radar antenna device and a method for measuring a direction.

According to a first aspect of the disclosure, a radar antenna device having the following configuration is provided. That is, the radar antenna device includes a housing, an antenna, and a magnetic direction measurement part. The antenna transmits and receives a radio wave while rotating inside the housing. The magnetic direction measurement part is accommodated in the housing, and measures a direction by magnetism.

Accordingly, since the magnetic direction measurement part that measures the direction by detecting geomagnetism can be integrated with the antenna into one radar antenna device, an inexpensive and compact radar antenna device having a direction measurement function can be realized.

The radar antenna device may have the following configuration. That is, the radar antenna device includes an antenna angle detector detecting an antenna rotation angle. The magnetic direction measurement part includes a magnetic detector and a direction calculator. The magnetic detector detects magnetism. The direction calculator performs a first calculation processing of calculating the direction based on the antenna rotation angle and a magnetic detection value from the magnetic detector.

Accordingly, the magnetic direction measurement part can calculate the direction considering the influence of rotation of the antenna on magnetic detection. Therefore, even though the magnetic direction measurement part is accommodated in the housing, the direction can be measured with high accuracy.

In the radar antenna device, the magnetic direction measurement part may further include a memory storing the antenna rotation angle in association with the magnetic detection value.

Accordingly, the magnetic detection value at each antenna rotation angle can be individually used.

The radar antenna device may have the following configuration. That is, the magnetic direction measurement part includes a correction value generator. The correction value generator generates a magnetic correction value for correcting a detection result of the magnetic detector. The magnetic correction value is generated based on the magnetic detection value stored in the memory for at least one rotation of the antenna.

Accordingly, the direction can be accurately calculated considering the fact that the influence on magnetic detection differs depending on the antenna rotation angle.

The radar antenna device may have the following configuration. That is, the magnetic correction value is generated at each particular antenna rotation angle. The memory stores the magnetic correction value in association with the antenna rotation angle.

Accordingly, since the magnetic detection value at each particular antenna rotation angle can be corrected, the direction can be more accurately calculated.

In the radar antenna device, the direction may be calculated by correcting the magnetic detection value using the magnetic correction value.

Accordingly, the influence of rotation of the antenna on magnetic detection can be corrected, and the direction can be accurately calculated.

In the radar antenna device, the magnetic correction value may be a difference between the magnetic detection value stored in the memory corresponding to the antenna rotation angle and an average value obtained by averaging the magnetic detection value stored in the memory over at least one rotation of the antenna.

Accordingly, the influence of rotation of the antenna on magnetic detection can be satisfactorily removed by simple calculation.

In the radar antenna device, the correction value generator may perform a filtering processing on the magnetic detection value stored in the memory before obtaining a relationship between the magnetic correction value for correcting the detection result of the magnetic detector and the antenna rotation angle.

Accordingly, the magnetic correction value can be more properly obtained by performing an appropriate filtering processing on data for obtaining the magnetic correction value.

In the radar antenna device, the filtering processing may be an averaging of a plurality of the magnetic detection values.

Accordingly, by simple processing, irregular noise contained in the magnetic detection value can be reduced in advance.

In the radar antenna device, the memory may store the magnetic detection value and the magnetic correction value in an updatable manner.

Accordingly, a change in the circumstances concerning the influence on magnetic detection is reflected and the direction can be acquired.

The radar antenna device may have the following configuration. That is, the radar antenna device includes an angular velocity detector and a measurement controller. The angular velocity detector measures an angular velocity when the direction of the radar antenna device changes. The measurement controller controls the measurement of the direction by the magnetic direction measurement part. The measurement controller stops the first calculation processing of the direction calculator when the angular velocity detected by the angular velocity detector is equal to or greater than a particular threshold.

That is, when a moving body on which the radar antenna device is mounted turns, the detection of geomagnetism becomes unstable, and a measurement error in the direction is likely to occur. Therefore, by stopping the first calculation processing when the moving body turns, deterioration in direction measurement accuracy can be prevented.

In the radar antenna device, when the first calculation processing is stopped, the direction calculator may perform a second calculation processing of acquiring the direction based on the direction obtained at a certain time and the angular velocity detected by the angular velocity detector.

Accordingly, for example, even in the case where the accuracy of the direction obtained by the first calculation processing cannot be expected, the direction can be alternatively acquired by the second calculation processing based on the detected angular velocity. As a result, continuity of direction measurement can be ensured.

The radar antenna device may have the following configuration. That is, the radar antenna device includes an angular velocity detector and a measurement controller. The angular velocity detector measures an angular velocity when the direction of the radar antenna device changes. The measurement controller controls the measurement of the direction by the magnetic direction measurement part. The direction calculator performs the first calculation processing or the second calculation processing. The second calculation processing calculates the direction based on the direction obtained at a certain time and the angular velocity detected by the angular velocity detector. The antenna is intermittently rotated. When the rotation of the antenna is stopped, the direction calculator performs the second calculation processing. When the antenna is rotating, the direction calculator performs the first calculation processing.

Accordingly, the second calculation processing that has a property of accumulating errors can be prevented from continuing for a long time by intermittently rotating the antenna to secure an opportunity for the first calculation processing. Therefore, for example, in the case where a radar function is not used for a long time, the direction can be accurately measured while achieving rotation stop of the antenna to some extent.

In the radar antenna device, the housing may be a radome.

Accordingly, an inexpensive radome type antenna device having the direction measurement function can be realized.

According to a second aspect of the disclosure, the following method for measuring a direction is provided. That is, a radio wave is transmitted and received while an antenna is rotated inside a housing provided in a radar antenna device. The direction is measured by a magnetic direction measurement part accommodated in the housing during the rotation of the antenna.

Accordingly, the direction can be measured while realizing an inexpensive and compact configuration of the radar antenna device.

DESCRIPTION OF THE EMBODIMENTS

Figure 1:
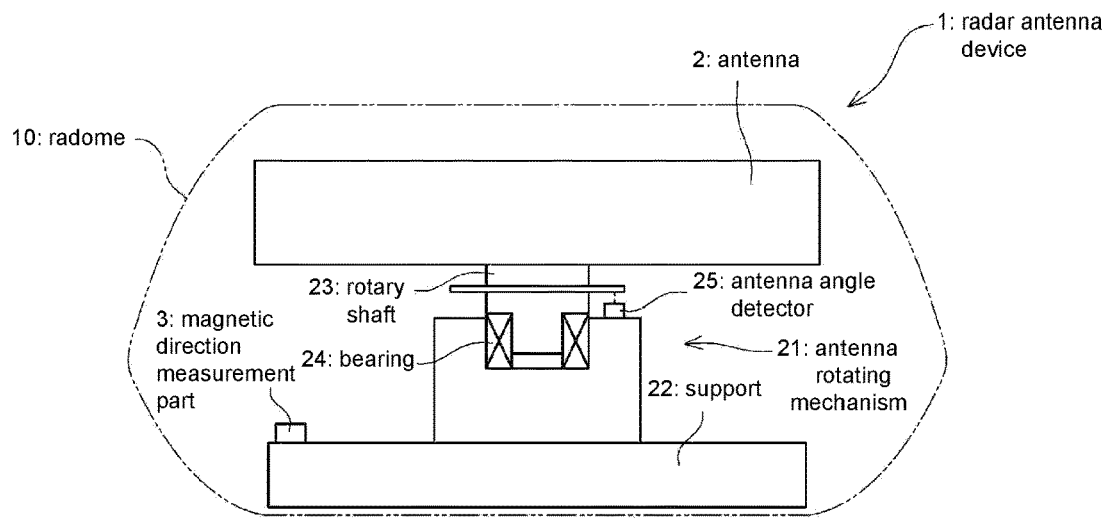
FIG. 1 is a schematic view showing a configuration of a radar antenna device according to a first embodiment of the disclosure.
Figure 2:
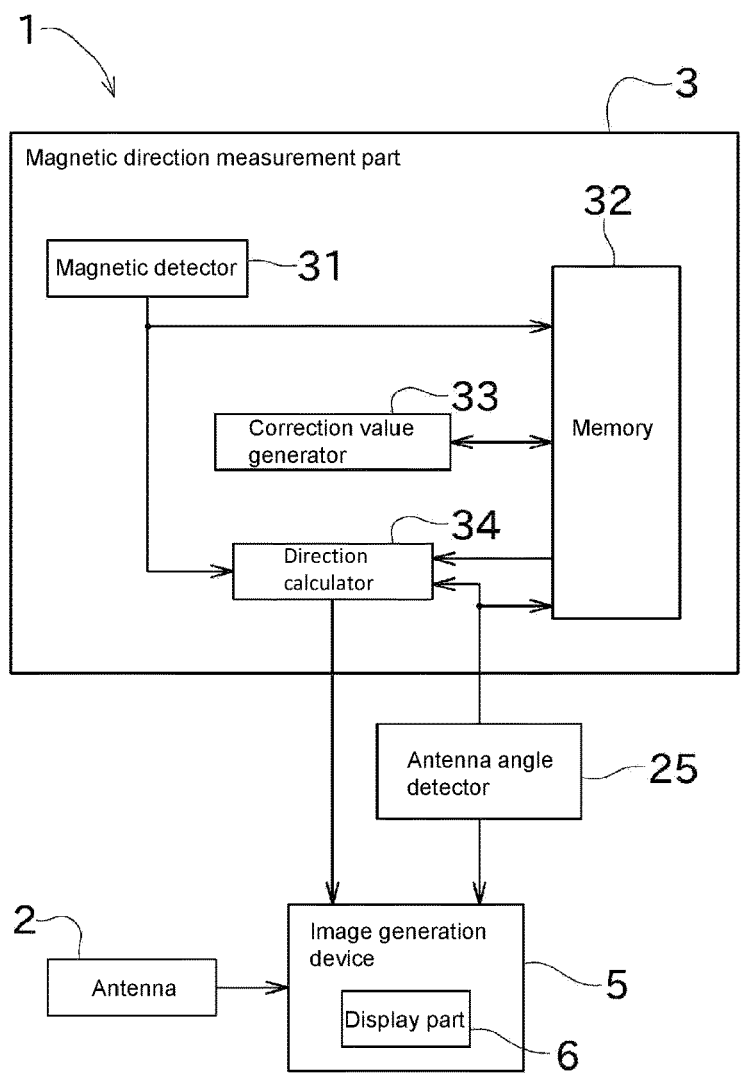
FIG. 2 is a block view showing an electrical configuration of the radar antenna device of the first embodiment.

Next, embodiments of the disclosure are described with reference to the drawings. FIG. 1 is an overview diagram showing a configuration of a radar antenna device 1 according to a first embodiment of the disclosure. FIG. 2 is a block view showing an electrical configuration of the radar antenna device 1 of the first embodiment.

The radar antenna device 1 shown in FIG. 1 is used, in a radar device provided in a ship (moving body) (not shown), for transmitting and receiving radio waves for detecting surroundings. The radar antenna device 1 is fixed to the ship's hull so that its front direction matches the direction of the ship's bow.

In the present embodiment, the radar antenna device 1 is configured as a radome type antenna device and includes a radome (housing) 10, an antenna 2, and a magnetic direction measurement part 3 (which is also referred to as processing circuitry).

The radome 10 is formed in a hollow shape, and accommodates therein the antenna 2 and the magnetic direction measurement part 3 and so on. The radome 10 protects internal components from wind and rain or the like. In order to improve detection performance, the radome 10 is formed of a material having a high radio wave transmittance, such as glass fiber or fluororesin or the like.

As shown in FIG. 2, the ship is provided with an image generation device 5. The image generation device 5 constitutes a part of the above-described radar device, and is electrically connected to the radar antenna device 1. The image generation device 5 includes a display part 6 configured as a known display. The image generation device 5 generates a radar image or the like based on echoes received at the antenna 2 and displays the radar image or the like on the display part 6.

The image generation device 5 is electrically connected to the magnetic direction measurement part 3 provided in the radar antenna device 1. The image generation device 5 can display, together with the radar image or the like, a direction of the radar antenna device 1 (in other words, the bow direction of the ship) measured by the magnetic direction measurement part 3 on the display part 6.

The display part 6 may be configured as a display externally connected to the image generation device 5. In addition, the direction of the radar antenna device 1 measured by the magnetic direction measurement part 3 may be displayed on a display disposed separately from the display part 6 that displays the radar image.

As shown in FIG. 1, the radar antenna device 1 includes an antenna rotating mechanism 21 and an antenna angle detector 25 in addition to the antenna 2. The antenna 2, the antenna rotating mechanism 21 and the antenna angle detector 25 are all disposed inside the radome 10.

The antenna rotating mechanism 21 includes a support 22, a rotary shaft 23, a bearing 24, and an electric motor (driving source) (not shown).

The support 22 is a base member supporting the antenna 2, and is disposed at the center of a lower part of the internal space of the radome 10. The rotary shaft 23 is a columnar body for rotating the antenna 2, and is disposed at the center of the radome 10 in a plan view with its longitudinal direction oriented in the up-down direction. The support 22 relatively rotatably supports the rotary shaft 23 via the bearing 24. The bearing 24 is formed of a steel material or the like resistant to rolling fatigue and having wear resistance.

By transmitting a driving force from the electric motor to the rotary shaft 23 through a transmission mechanism (for example, a gear or a belt or the like) (not shown), the antenna 2 can be rotated. The antenna 2 may repeatedly, or may simultaneously and continuously, transmit a radio wave and receive a reflected wave of the radio wave reflected by a target, while rotating at a particular speed and changing a transmission direction of the radio wave. Accordingly, the target such as another ship or the like can be detected over 360° around the ship.

The antenna angle detector 25 is attached to an appropriate position on the support 22, and detects a rotation angle of the rotary shaft 23 (antenna 2). The antenna angle detector 25 can be composed of, for example, an angle detection sensor such as a rotary encoder or the like. How a detected value of the rotation angle is expressed is arbitrary. For example, a state is set to zero in which a radio wave transmission and reception direction of the antenna 2 is facing the front of the radar antenna device 1, and an angle by which the antenna 2 has been rotated from that state can be used to express the detected value of the rotation angle.

The antenna angle detector 25 outputs the detected value of the rotation angle of the antenna 2 to a control part (not shown) for radar image generation processing. Further, the antenna angle detector 25 outputs the detected value to the magnetic direction measurement part 3.

The magnetic direction measurement part 3 measures a direction by detecting geomagnetism, and outputs the obtained direction to the image generation device 5. The magnetic direction measurement part 3 is attached to an appropriate position on the radar antenna device 1 as shown in FIG. 1.

As shown in FIG. 2, the magnetic direction measurement part 3 includes a magnetic detector 31, a memory 32, a correction value generator 33 (which is also referred to as processing circuitry), and a direction calculator 34 (which is also referred to as processing circuitry). Moreover, at least the magnetic detector 31 within the magnetic direction measurement part 3 may be disposed in the radome 10, and the other components may be disposed outside the radome 10.

The magnetic detector 31 is configured as a two-axis magnetic sensor detecting magnetic field strength in two directions orthogonal to each other in a plane perpendicular to the rotary shaft of the antenna 2. The magnetic direction measurement part 3 is, for example, disposed in the radar antenna device 1 so that a first axis (X axis) among two detection axes of the magnetic detector 31 is oriented in the left-right direction of the radar antenna device 1, and a second axis (Y axis) is oriented in the front-back direction. The magnetic detector 31 outputs magnetic detection values in the directions of the two detection axes to the memory 32 and the direction calculator 34.

The memory 32 stores the magnetic detection values input from the magnetic detector 31 so as to accumulate them. The correction value generator 33 generates a magnetic correction value for correcting a detection result of the magnetic detector 31 by analyzing the accumulated magnetic detection values. When the magnetic correction value is generated, the direction calculator 34 calculates a direction so as to correct the magnetic detection value output by the magnetic detector 31 based on the magnetic correction value.

The memory 32, the correction value generator 33 and the direction calculator 34 mentioned above can be realized by a computer having a known configuration. Specifically, this computer includes a CPU, a ROM, a RAM and so on, wherein the ROM stores a program or the like for realizing a method for measuring a direction of the disclosure. By the cooperation of the above-mentioned hardware and software, the computer can function as the memory 32, the correction value generator 33, and the direction calculator 34 and so on.

The memory 32 associates an antenna rotation angle input from the antenna angle detector 25 with the magnetic detection values in two directions input from the magnetic detector 31 and stores the same as accumulation data for generating the magnetic correction value.

The memory 32 stores the accumulation data for at least one rotation of the antenna 2. In order to satisfactorily perform later-described noise reduction processing, the memory 32 may be capable of storing the accumulation data for not only one rotation but a plurality of rotations (for example, several rotations to several tens of rotations) of the antenna 2.

The stored accumulation data are used when the correction value generator 33 generates the magnetic correction value. Moreover, in a state in which the direction of the radar antenna device 1 is constant, these accumulation data may be data in which the magnetic detection value detected by the magnetic detector 31 and the antenna rotation angle related to the magnetic detection value are associated with each other. Accordingly, since a direction component contained in the magnetic detection value is constant, the magnetic correction value can be more accurately generated using the accumulation data thus obtained.

In addition, the disclosure is not limited to this configuration. For example, it is also possible to use an angular velocity sensor at the same time and acquire the accumulation data in which the magnetic detection value and the antenna rotation angle are associated with each other in each bow direction based on an angular velocity that can reflect a position (bow direction) of the hull and the magnetic detection value. That is, the accumulation data for generating the magnetic correction value can be suitably acquired even on a ship under way.

The memory 32 is configured as a memory whose stored content is updatable. After the accumulation data have been written to all memory areas secured for the accumulation data, when information concerning new accumulation data is input to the memory 32, the oldest stored accumulation data is discarded in order to secure a memory area for the newest accumulation data. Accordingly, the content stored in the memory 32 can be updated at any time, and the latest accumulation data can always be stored.

Based on the accumulation data for at least one rotation of the antenna 2 among the accumulation data stored in the memory 32, the correction value generator 33 creates the magnetic correction value for correcting the magnetic detection value detected by the magnetic detector 31 according to an antenna angle. This magnetic correction value is a correction value for two axes generated at each antenna rotation angle over an angle range of one rotation (360°) of the antenna 2.

Although the details will be described later, the above-mentioned magnetic correction value is created by calculating a trend of change in the magnetic detection value according to the rotation angle of the antenna 2 based on the accumulation data. Therefore, this magnetic correction value can be a correction value for canceling, among influences of magnetic noise on the magnetic detection value of the magnetic detector 31, periodic noise depending on the rotation angle of the antenna 2.

The correction value generator 33 outputs to the memory 32 the magnetic correction value generated corresponding to the antenna rotation angle. The memory 32 stores the antenna rotation angle input from the correction value generator 33 that is related to a magnetic correction value in association with the magnetic correction value.

The generation and output of the magnetic correction value by the correction value generator 33 are repeatedly performed at an appropriate frequency based on the newest content stored in the memory 32. When a new magnetic correction value is input from the correction value generator 33, the memory 32 associates the magnetic correction value with the antenna rotation angle related to the magnetic correction value and updates the stored magnetic correction value to the newest value.

With respect to the magnetic detection values in two directions input from the magnetic detector 31, the direction calculator 34 performs a correction calculation according to the antenna rotation angle input from the antenna angle detector 25 using the magnetic correction value stored in the memory 32.

The direction calculator 34 performs the correction calculation as above, and obtains the direction of the radar antenna device 1 based on a direction of a vector indicated by the magnetic detection values in two directions after correction. Accordingly, during rotation of the antenna 2, the direction of the radar antenna device 1 can be acquired. The direction calculator 34 outputs the obtained direction to the image generation device 5.

By the way, as is known, a magnetic body such as a steel material constituting the hull is magnetized for some reason, and due to the magnetism generated by the magnetic body, the detection of geomagnetism by the magnetic sensor may be influenced. Since this influence can be removed by a known method called magnetic deviation correction, it is basically not a problem.

On the other hand, it is also conceivable that a magnetic body (referred to as a rotating magnetic body in the following description) such as the bearing 24 or the like that is disposed inside the radome 10 in the vicinity of the magnetic direction measurement part 3 and rotates with rotation of the antenna 2 is magnetized. In this case, since the magnetic field changes with the rotation of the antenna 2, the influence of the rotating magnetic body cannot be removed by the above-mentioned magnetic deviation correction. As a result, as the antenna 2 rotates, for example, pulse-like noise may occur in the magnetic detection value, and the direction detection accuracy may deteriorate.

In this regard, in the present embodiment, the direction calculator 34 corrects the magnetic detection value detected by the magnetic detector 31 based on the magnetic correction value according to the angle of the antenna 2, and calculates the direction based on the magnetic detection value after correction. Accordingly, the influence of the magnetism generated by the rotating magnetic body disposed around the magnetic detector 31 can be removed, and the geomagnetism can be accurately measured.

Figure 3:
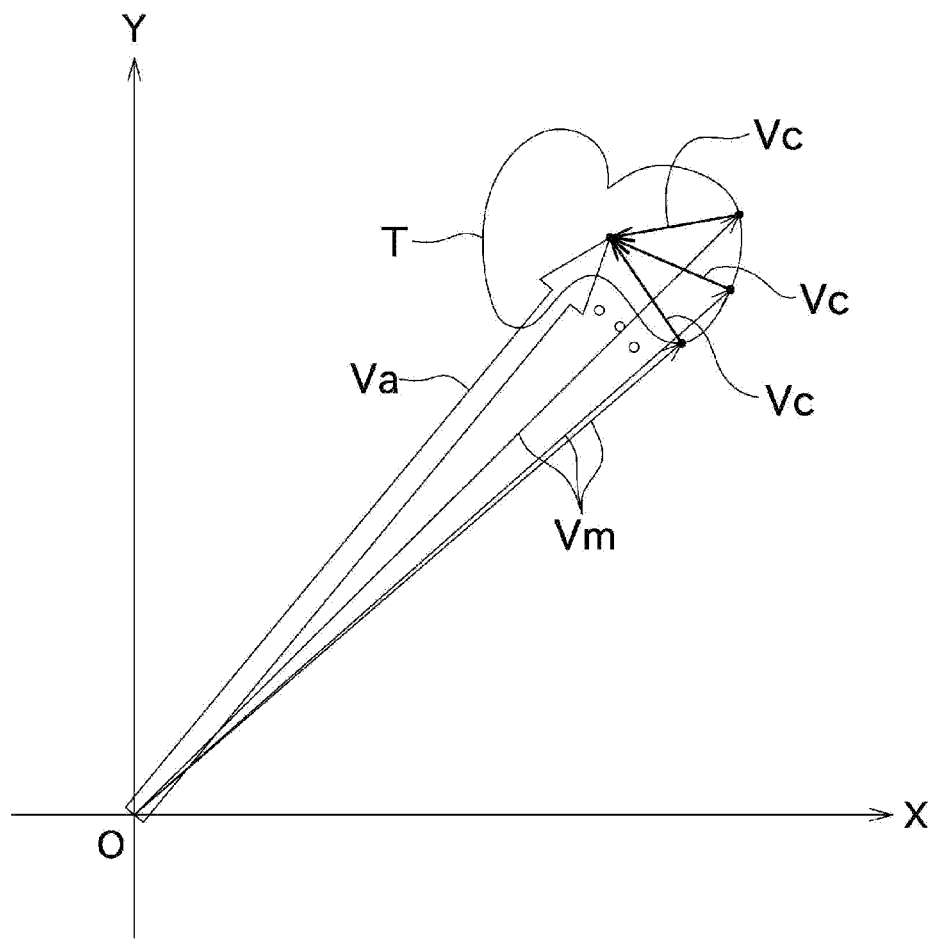
FIG. 3 is a conceptual diagram illustrating a processing of creating a magnetic correction value using a vector of a magnetic detection value on a coordinate plane.
Figure 4:
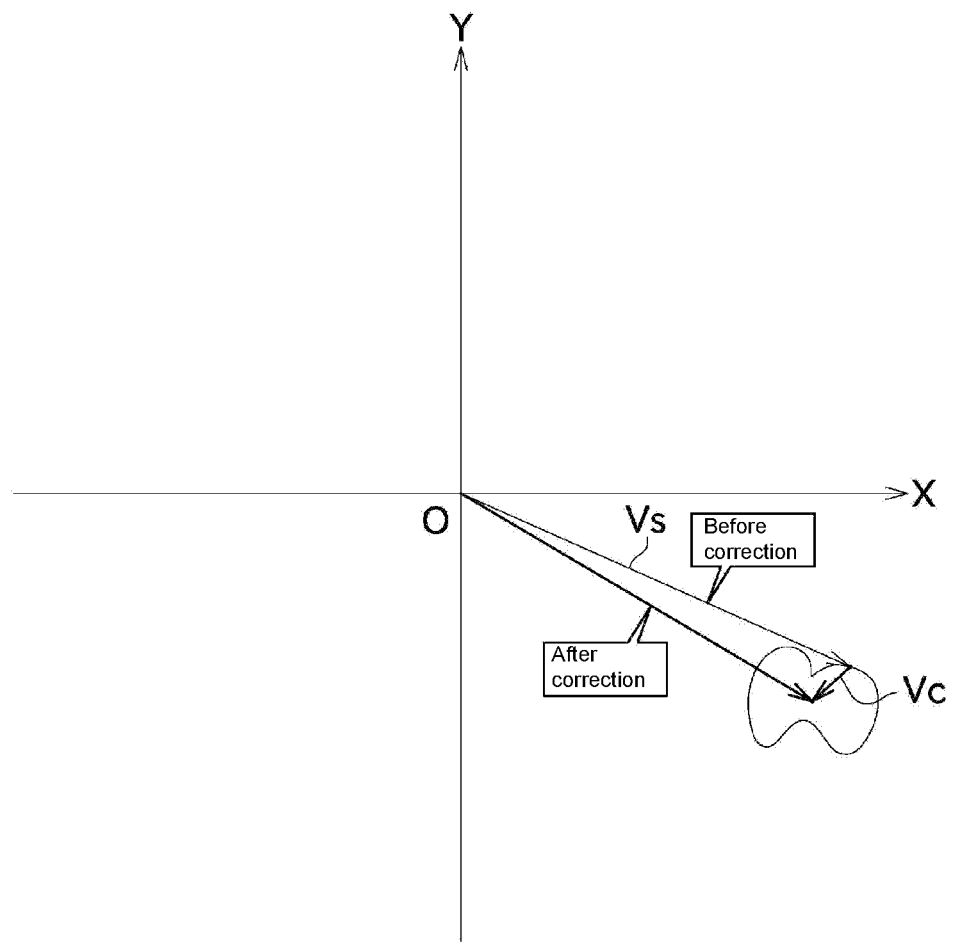
FIG. 4 is a conceptual diagram illustrating a processing in which an example of a magnetic detection value detected at a certain antenna angle is corrected based on a magnetic correction value.
Figure 5:
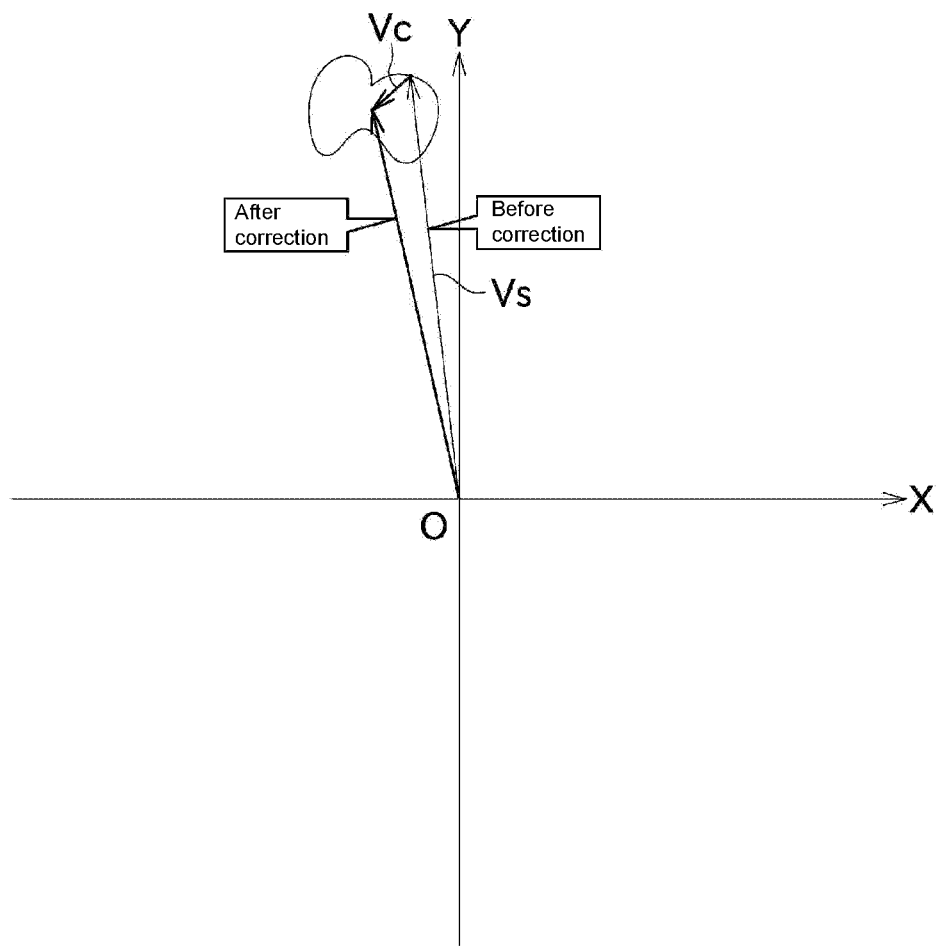
FIG. 5 is a conceptual diagram illustrating a processing in which another example of the magnetic detection value detected at the same antenna angle as in FIG. 4 is corrected based on the magnetic correction value.

Next, creation of the magnetic correction value and correction of the magnetic detection value using the magnetic correction value will be described in detail with reference to FIG. 3 to FIG. 5. FIG. 3 is a conceptual diagram illustrating a processing of creating the magnetic correction value using a vector of the magnetic detection value on a coordinate plane. FIG. 4 is a conceptual diagram illustrating a processing in which an example of the magnetic detection value detected at a certain antenna angle is corrected based on the magnetic correction value. FIG. 5 is a conceptual diagram illustrating a processing in which another example of the magnetic detection value detected at the same antenna angle as in FIG. 4 is corrected based on the magnetic correction value.

First, the correction value generator 33 performs, as preprocessing, a processing of reducing irregular noise on the magnetic detection value contained in the accumulation data acquired from the memory 32, and acquires the magnetic detection value for one rotation of the antenna 2.

There are various specific examples of noise reduction processing. For example, it is conceivable to extract from the accumulation data for one rotation a plurality of magnetic detection values continuous in a rotation direction of the antenna 2 and calculate averages respectively for the X-axis direction and the Y-axis direction. In addition, in the case where the accumulation data are stored over a plurality of rotations of the antenna 2, a plurality of magnetic detection values corresponding to the same antenna angle can be extracted and averages can be calculated respectively for the X-axis direction and the Y-axis direction. These average calculation processings may be performed alone or in combination.

The above-mentioned average calculation processing can be considered as a kind of filtering processing. By reducing the irregular noise contained in the magnetic detection value in advance, it is possible to create a correction table in a form in which the noise caused by the rotating magnetic body is relatively emphasized, and the correction can be effectively performed. As the preprocessing performed on the magnetic detection value, any other filtering processing may be performed instead of the filtering processing of calculating the average. In addition, the preprocessing can also be omitted.

When the noise reduction processing is performed and the magnetic detection value for one rotation of the antenna is acquired, the correction value generator 33 obtains an average of the magnetic detection value for the one rotation for each of the X axis and the Y axis.

FIG. 3 illustrates an example of a magnetic vector Vm indicated by the magnetic detection values in the X-axis direction and the Y-axis direction acquired by the magnetic detector 31 on an XY plane. Each magnetic vector Vm contains a geomagnetism component, a magnetic noise component generated by the rotating magnetic body, and a magnetic component generated by other structure or the hull.

FIG. 3 shows an example in which the direction of the radar antenna device 1 does not change during one rotation of the antenna 2. Like this, even if the direction of the radar antenna device 1 does not change, since the magnetic noise component generated by the rotating magnetic body is influenced by a rotation phase of the antenna 2, as the antenna 2 rotates, a tip of the magnetic vector Vm changes so as to draw a small trajectory T.

The trajectory T may take various forms depending on how the rotating magnetic body is magnetized and so on. The trajectory T is a loop-shaped figure, which is based on periodic regularity of the magnetic noise component generated by the rotating magnetic body.

The average calculation processing of the magnetic detection value performed by the correction value generator 33 corresponds to calculation of a vector (average vector Va in FIG. 3) obtained by averaging a large number of magnetic vectors Vm over one rotation of the antenna 2. This average vector Va can be considered to be substantially equal to the magnetic vector in the case where there is no magnetic component generated by the rotating magnetic body.

Thereafter, with respect to each of the magnetic vectors Vm for one rotation of the antenna, the correction value generator 33 obtains a correction vector Vc by subtracting the magnetic vector Vm from the average vector Va. Subsequently, the correction value generator 33 associates a value of an X component and a value of a Y component of each correction vector Vc with the antenna rotation angle as the magnetic correction values in two directions.

According to the above, the magnetic correction value can be created in association with the antenna rotation angle. As shown above, by calculating the magnetic correction value as a difference between the average of the magnetic detection value and the original magnetic detection value, a simple processing can be realized, and the magnetic noise component generated by the rotating magnetic body can be satisfactorily removed.

The direction calculator 34 acquires, from the memory 32, the magnetic detection values in two directions corresponding to the current antenna rotation angle input from the antenna angle detector 25. Then, by adding the above-mentioned magnetic correction values respectively to the magnetic detection values in two directions input from the magnetic detector 31, the magnetic detection values after correction are obtained. This correction corresponds to addition of the correction vector Vc to a magnetic vector Vs of the detection value shown in FIG. 4. Accordingly, the influence of the magnetic noise component generated by the rotating magnetic body can be satisfactorily removed from the magnetic detection values acquired by the magnetic detector 31.

Thereafter, the direction calculator 34 calculates the direction using the magnetic detection values after correction. Then, at appropriate timing, the direction calculator 34 performs magnetic deviation correction and removes the magnetic component generated by a structure or the hull or the like that is contained in the magnetic detection value. In this way, since the influence of magnetic noise caused by the structure or the hull and the rotating magnetic body is removed, the direction calculator 34 can calculate the direction with high accuracy.

The above-mentioned magnetic correction value relates to the influence of the magnetism generated by the rotating magnetic body on the magnetic detection value of the magnetic direction measurement part 3 and the rotation angle of the antenna 2 based on the radar antenna device 1. Therefore, this magnetic correction value can be applied in common regardless of the direction of the radar antenna device 1 (in other words, the bow direction of the ship). For example, correction is made to both of the following cases using the same correction vector Vc: a case where the magnetic detection value indicated by the magnetic vector Vs in FIG. 4 is generated at a certain antenna angle, and a case where the magnetic detection value indicated by the magnetic vector Vs in FIG. 5 is generated at the same antenna angle. As a result, the correction processing can be simplified.

By the way, the circumstances concerning magnetization of the rotating magnetic body change in various ways as time passes. For this reason, the correction value generator 33 may re-create the magnetic correction value at an appropriate frequency. The re-creation of the magnetic correction value may be performed every time the antenna 2 rotates once, or may be performed at regular timing, such as once an hour, once a day, or the like. Further, the correction value generator 33 may re-create the correction table at irregular timing such as a timing when the power of the radar device is turned on, a timing when turning of the ship is detected, or the like. Accordingly, new circumstances concerning magnetization of the rotating magnetic body are reflected and the magnetic detection value can be corrected.

As described above, the radar antenna device 1 of the present embodiment includes the radome 10, the antenna 2, and the magnetic direction measurement part 3. The antenna 2 transmits and receives a radio wave while rotating inside the radome 10. The magnetic direction measurement part 3 is accommodated in the radome 10, and measures a direction by magnetism.

In this way, since the magnetic direction measurement part 3 using geomagnetism and the antenna 2 can be integrated into one radar antenna device 1, the radar antenna device 1 being inexpensive and compact and having the direction measurement function can be realized.

Figure 6:
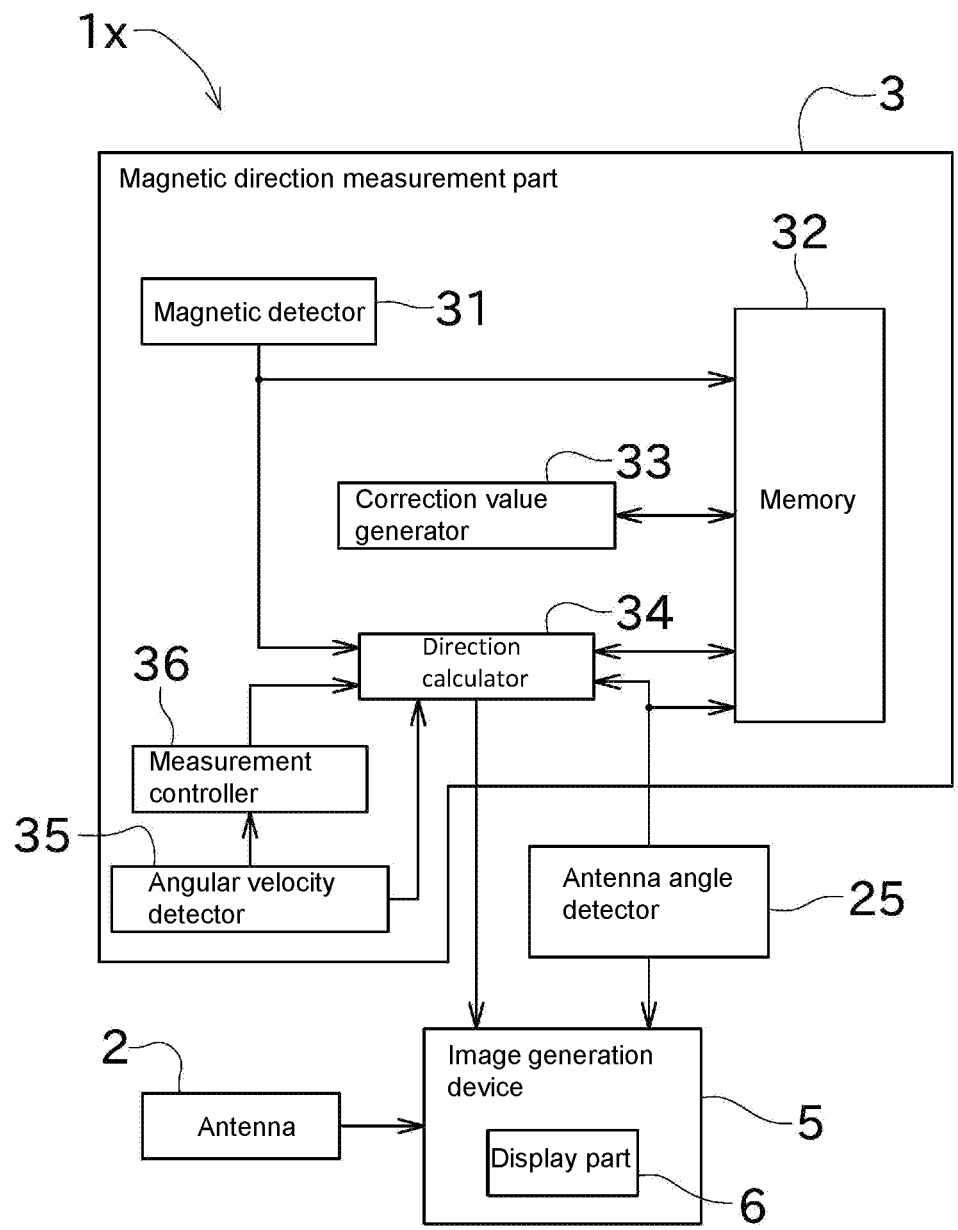
FIG. 6 is a block view showing a configuration of a radar antenna device of a second embodiment.

Next, a second embodiment of the disclosure will be described with reference to FIG. 6. FIG. 6 is a block view showing a configuration of a radar antenna device 1x of the second embodiment. In the description of the present embodiment, the same or similar members to those in the previous embodiment are denoted by the same reference numerals in the drawings, and description thereof may be omitted.

The radar antenna device 1x of the present embodiment shown in FIG. 6 includes an angular velocity detector 35 and a measurement controller 36 (which is also referred to as processing circuitry) in addition to the configuration of the above-described first embodiment. The angular velocity detector 35 and the measurement controller 36 may be included in the magnetic direction measurement part 3 as shown in FIG. 6, or may be configured separate from the magnetic direction measurement part 3.

The angular velocity detector 35 is composed of, for example, a vibration gyro sensor, and can detect an angular velocity when the direction of the radar antenna device 1 (in other words, the bow direction of the ship) changes by detecting the magnitude of the Coriolis force generated when a vibrating element rotates. The angular velocity detected by the angular velocity detector 35 is output to the direction calculator 34 and also to the measurement controller 36. Instead of a vibration gyro sensor, other sensor such as, for example, a capacitance gyro sensor or the like may be used as the angular velocity detector 35.

The measurement controller 36 is realized by the above-described computer. The measurement controller 36 monitors the angular velocity input from the angular velocity detector 35, and switches a method by which the direction calculator 34 calculates the direction based on the magnitude of the angular velocity.

Hereinafter, a specific description will be given. In the present embodiment, the direction calculator 34 calculates the direction by two types of processings. Among the two processings, a first calculation processing is to calculate and obtain the direction based on the detection result of the magnetic detector 31, as described in the above-described first embodiment. A second calculation processing is to calculate and obtain the direction based on a detection result of the angular velocity detector 35.

The direction calculator 34 can calculate the direction while switching between a first mode in which the first calculation processing is performed and a second mode in which the second calculation processing is performed.

The measurement controller 36 controls the direction calculator 34 so that the direction calculator 34 enters the first mode and performs the first calculation processing when the angular velocity detected by the angular velocity detector 35 is less than a particular threshold, and that the direction calculator 34 enters the second mode and performs the second calculation processing when the angular velocity is equal to or greater than the particular threshold.

In the present embodiment, in the first mode, every time a direction is obtained by calculation, the direction calculator 34 outputs the direction to the memory 32. Therefore, the memory 32 always stores the newest direction obtained by the first calculation processing. When the mode is switched from the first mode to the second mode, the latest direction stored in the memory 32 is input to the direction calculator 34 as the direction at a particular time. In the second mode, the direction calculator 34 adds a direction change amount obtained by integrating the angular velocity input from the angular velocity detector 35 to the input direction, thereby obtaining the current direction. Also, in the second mode, the direction calculator 34 outputs the obtained newest direction to the memory 32. The memory 32 stores the newest direction obtained by the second calculation processing, and the direction is used by the direction calculator 34 for calculating the direction next time in the second mode.

In a state (turning state) in which the ship is turning, since the magnetism detected by the magnetic detector 31 changes every moment, when the direction is measured based on the magnetism, an error is likely to increase. In this regard, the measurement controller 36 of the present embodiment determines whether the ship is in the turning state based on the magnitude of the angular velocity detected by the angular velocity detector 35. When it is determined that the ship is in the turning state, the measurement controller 36 controls the direction calculator 34 to stop the calculation (first calculation processing) of the direction based on the magnetism detected by the magnetic detector 31. Accordingly, deterioration in direction measurement accuracy can be prevented. In addition, when the first calculation processing is stopped, the measurement controller 36 controls the direction calculator 34 to shift from the first mode to the second mode and perform the calculation (second calculation processing) of the direction based on the angular velocity detected by the angular velocity detector 35. Accordingly, continuity of direction measurement can be ensured.

In the second calculation processing, since the direction calculator 34 obtains the direction by adding a displacement at any time based on a detected value of the angular velocity detector 35, errors accumulate as time passes, and the direction measurement accuracy gradually deteriorates. In this regard, in the present embodiment, when it is determined that the ship is not in the turning state, the measurement controller 36 controls the direction calculator 34 to shift from the second mode to the first mode. Therefore, since the direction is basically measured based on magnetism, and the direction is measured based on the angular velocity in a transient state in which the direction of the ship changes, the direction can be obtained with good accuracy as a whole.

Further, when the angular velocity detected by the angular velocity detector 35 is equal to or greater than the particular threshold, the measurement controller 36 performs controls so that the magnetic detection value detected by the magnetic detector 31 is not output to the memory 32 or the magnetic detection value output from the magnetic detector 31 is not stored. Accordingly, the above-described magnetic correction value is prevented from being created based on the data accumulated in a state in which the detection of magnetism is unstable, and the direction calculator 34 can satisfactorily correct the magnetic detection value in the first calculation processing.

Next, a description will be given of a control in a case where the ship sails while rotation of the antenna 2 is stopped in the radar antenna device 1.

In order for the radar device to continuously detect the surroundings, the antenna 2 may be constantly rotating. However, the ship may sail in a state in which rotation of the antenna 2 is stopped for some reason, such as when a user determines that detection by the radar device is unnecessary or the like.

For example, when an incremental type encoder is used as the antenna angle detector 25, a zero angle state in which the antenna 2 faces directly forward is detected by another sensor, and based on a value obtained by counting signals of the encoder that have been output from that state to the present, an angle of the antenna 2 is acquired. However, when the antenna 2 stops rotating, since the zero angle state cannot be detected over a long time, reliability of the antenna angle detected by the antenna angle detector 25 gradually decreases as time passes. Therefore, it may be difficult to properly correct the magnetic detection value based on the correction table.

Considering this, in the present embodiment, even if the rotation stop of the antenna 2 is instructed by the user, by rotating the antenna 2 intermittently at certain time intervals, in conjunction with which the direction calculator 34 calculates the direction while switching between the first mode and the second mode, the direction measurement accuracy is ensured. Specifically, the measurement controller 36 repeats the following control: switching the direction calculator 34 from the first mode to the second mode to perform the second calculation processing immediately after stopping the rotation of the antenna 2, after some time has passed, automatically restarting the rotation of the antenna 2 and switching the direction calculator 34 to the first mode to perform the first calculation processing, and immediately thereafter, stopping the rotation of the antenna 2 again. Accordingly, by rotating the antenna 2 at a certain frequency and performing the first calculation processing, the errors accumulated in the second calculation processing can be corrected, and the direction measurement accuracy can be kept good for a long time.

Although the preferred embodiments of the disclosure have been described above, the above configuration can be modified as follows, for example.

The memory 32 can be modified to store the antenna rotation angle in association with the magnetic correction value over the angle range of, for example, a plurality of rotations of the antenna 2, not limited to one rotation of the antenna 2.

In the second embodiment, when the angular velocity detected by the angular velocity detector 35 is equal to or greater than the particular threshold, the direction calculator 34 can also be configured to only stop the first calculation processing and not perform the second calculation processing.

The magnetic correction value can be used in place of the bearing 24 to remove the influence of other rotating magnetic body.

The magnetic detector 31 can also be changed to a three-axis magnetic sensor instead of a two-axis magnetic sensor.

The disclosure is not limited to the radome type, but can also be configured as an open antenna device in which the antenna rotates outside the housing. In this case, the housing accommodates, for example, an antenna rotating mechanism and an electric motor and so on.

Terms

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z. or any combination thereof (e.g., X, Y, and/or Z). Thus, such disjunctive language is not generally intended to, and should not, imply that certain embodiments require at least one of X, at least one of Y. or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below." "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A radar antenna device, adapted to obtain a pointing orientation of the radar antenna device, the pointing orientation corresponding to a traveling direction of a moving object on which the radar antenna device is disposed, the radar antenna device comprising:
   a housing;
   an antenna configured to transmit and receive a radio wave while rotating inside the housing;
   a two-axis magnetic sensor located inside the housing and configured to detect a magnetic field strength including a first magnetic field strength generated by an external structure and a second magnetic field strength, wherein the two-axis magnetic sensor is configured to output a magnetic detection value corresponding to the magnetic field strength;
   a processor configured to generate a magnetic correction value for correcting the magnetic detection value, the magnetic correction value corresponding to the first magnetic field strength generated by the external structure, and obtain a corrected magnetic detection value corresponding to the second magnetic field strength based on the magnetic detection value and the magnetic correction value, and perform a first calculation processing to obtain the pointing orientation of the radar antenna device based on the corrected magnetic detection value;
   a rotary encoder configured to detect a plurality of antenna rotation angles; and
   a memory configured to store a plurality of the magnetic detection values in association with the plurality of antenna rotation angles,
   the magnetic correction value is generated based on an average value of the plurality of the magnetic detection values for at least one rotation of the antenna, and a plurality of the magnetic correction values is generated in association with the plurality of antenna rotation angles and are stored in the memory.

2. The radar antenna device according to claim 1, wherein the magnetic correction value is a difference between the magnetic detection value stored in the memory corresponding to the antenna rotation angle and the average value of the plurality of the magnetic detection values stored in the memory over at least one rotation of the antenna.

3. The radar antenna device according to claim 1, wherein the processor performs a filtering processing on the magnetic detection value stored in the memory before obtaining a relationship between the magnetic correction value for correcting the detection result of the two-axis magnetic sensor and the rotation angle.

4. The radar antenna device according to claim 3, wherein the filter processing is an averaging of a plurality of the magnetic detection values.

5. The radar antenna device according to claim 1, wherein the memory stores the magnetic detection value and the magnetic correction value in an updatable manner.

6. The radar antenna device according to claim 1, further comprising:
   a gyro sensor configured to measure an angular velocity when the direction of the radar antenna device changes; and
   wherein the processor is further configured to control the measurement of the pointing orientation by stopping the first calculation processing when the angular velocity detected by the gyro sensor is equal to or greater than a particular threshold.

7. The radar antenna device according to claim 1, further comprising:
   a gyro sensor configured to measure an angular velocity when the pointing orientation of the radar antenna device changes; and
   wherein the processor is further configured to control the measurement of the pointing orientation by stopping the first calculation processing when the angular velocity detected by the gyro sensor is equal to or greater than a particular threshold.

8. The radar antenna device according to claim 2, further comprising:
a gyro sensor configured to measure an angular velocity when the pointing orientation of the radar antenna device changes; and
wherein the processor is further configured to control the measurement of the pointing orientation by stopping the first calculation processing when the angular velocity detected by the gyro sensor is equal to or greater than a particular threshold.

9. The radar antenna device according to claim 6, wherein when the first calculation processing is stopped, the processor performs a second calculation processing of calculating the pointing orientation based on the pointing orientation obtained at a certain time and the angular velocity detected by the gyro sensor.

10. The radar antenna device according to claim 1, further comprising:
a gyro sensor configured to measure an angular velocity when the pointing orientation of the radar antenna device changes; and
wherein the processor is configured to control the measurement of the pointing orientation,
perform the first calculation processing, or
perform a second calculation processing of calculating the pointing orientation based on the pointing orientation obtained at a certain time and the angular velocity detected by the gyro sensor; wherein
the antenna is intermittently rotated,
when the rotation of the antenna is stopped, the processor performs the second calculation processing, and
when the antenna is rotating, the processor performs the first calculation processing.

11. The radar antenna device according to claim 1, further comprising:
a gyro sensor configured to measure an angular velocity when the pointing orientation of the radar antenna device changes; and
wherein the processor is configured to control the measurement of the pointing orientation,
perform the first calculation processing, or
perform a second calculation processing of calculating the pointing orientation based on the pointing orientation obtained at a certain time and the angular velocity detected by the gyro sensor; wherein
the antenna is intermittently rotated,
when the rotation of the antenna is stopped, the processor performs the second calculation processing, and
when the antenna is rotating, the processor performs the first calculation processing.

12. The radar antenna device according to claim 2, further comprising:
a gyro sensor configured to measure an angular velocity when the pointing orientation of the radar antenna device changes; and
wherein the processor is configured to control the measurement of the pointing orientation,
perform the first calculation processing, or
perform a second calculation processing of calculating the pointing orientation based on the pointing orientation obtained at a certain time and the angular velocity detected by the gyro sensor; wherein
the antenna is intermittently rotated,
when the rotation of the antenna is stopped, the processor performs the second calculation processing, and
when the antenna is rotating, the processor performs the first calculation processing.

13. The radar antenna device according to claim 1, wherein the housing is a radome.

14. A method for measuring a pointing orientation of a radar antenna device, and the pointing orientation corresponding to a traveling direction of a moving object on which the radar antenna device is disposed, the method comprising:
transmitting and receiving a radio wave while rotating an antenna inside a housing provided in a radar antenna device;
detecting a magnetic field strength including a first magnetic field strength generated by an external structure and a second magnetic field strength by using a two-axis magnetic sensor located inside the housing, wherein the two-axis magnetic sensor is configured to output a magnetic detection value corresponding to the magnetic field strength;
generating a magnetic correction value for correcting the magnetic detection value, the magnetic correction value corresponding to the first magnetic field strength generated by the external structure, and obtaining a corrected magnetic detection value corresponding to the second magnetic field strength based on the magnetic detection value and the magnetic correction value, and performing a first calculation processing to obtain the pointing orientation of the radar antenna device based on the corrected magnetic detection value;
detecting a plurality of antenna rotation angles by a rotary encoder and storing a plurality of the magnetic detection values in association with the plurality of antenna rotation angles in a memory; and
generating the magnetic correction value based on an average value of the plurality of the magnetic detection values for at least one rotation of the antenna, and generating a plurality of the magnetic correction values in association with the plurality of antenna rotation angles and storing the plurality of the magnetic correction values in the memory.

* * * * *